United States Patent
Benveniste

[19]

[11] Patent Number: 5,956,643
[45] Date of Patent: *Sep. 21, 1999

[54] APPARATUS AND METHOD FOR ADAPTIVE DYNAMIC CHANNEL ASSIGNMENT IN WIRELESS COMMUNICATION NETWORKS

[75] Inventor: Mathilde Benveniste, South Orange, N.J.

[73] Assignee: Lucent Technologies Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/401,387

[22] Filed: Mar. 9, 1995

Related U.S. Application Data

[63] Continuation-in-part of application No. 08/183,384, Jan. 13, 1994, Pat. No. 5,404,574.

[51] Int. Cl.⁶ ..................................................... H04Q 7/20
[52] U.S. Cl. .................. 455/452; 455/62; 455/63
[58] Field of Search ............................. 455/33.1, 62, 63, 455/54.1, 54.2, 56.1, 65, 34.1, 34.2, 67.1, 67.3, 450, 452, 455; 379/59, 60

[56] References Cited

U.S. PATENT DOCUMENTS

| | | |
|---|---|---|
| 3,764,915 | 10/1973 | Cox ........................................ 455/33.1 |
| 4,965,850 | 10/1990 | Schloemer . |
| 5,093,924 | 3/1992 | Toshiyuki et al. ....................... 455/450 |
| 5,127,100 | 6/1992 | D'Amico et al. ....................... 455/33.1 |
| 5,134,709 | 7/1992 | Bi et al. .................................. 455/452 |
| 5,157,709 | 10/1992 | Ohteru ....................................... 455/63 |
| 5,280,630 | 1/1994 | Wang ...................................... 455/452 |
| 5,437,054 | 7/1995 | Rappaport et al. ..................... 455/451 |
| 5,448,750 | 9/1995 | Eriksson et al. ....................... 455/33.1 |
| 5,448,754 | 9/1995 | Ho et al. ................................ 455/34.2 |
| 5,475,868 | 12/1995 | Duque-Anton et al. ................ 455/452 |
| 5,613,198 | 3/1997 | Ahmadi et al. . |

*Primary Examiner*—Edward F. Urban

[57] ABSTRACT

A channel assignment system assigns channels to various cells by the optimal partitioning of the available radio frequencies into non-overlapping sets, the optimal grouping of co-user cells, and the best assignment of the former to the latter. The objective is the maximization of traffic handling capacity which, given the multitude of cells, is expressed as the maximization of a bottleneck capacity ratio. The capacity ratio for a cell is defined as the ratio of the number of radio frequencies assigned to the cell over the number of radio frequencies needed to meet blocking probability requirements. The solution to attain an optimal non-regular channel assignment is decomposed into two mathematical programs designated a Master Program and a Subprogram. These are solved iteratively with assistance from a channel set augmentation technique implemented between solutions of the Master and Subprogram.

9 Claims, 9 Drawing Sheets

APPARATUS AND METHOD FOR ADAPTIVE DYNAMIC CHANNEL ASSIGNMENT IN WIRELESS COMMUNICATION NETWORKS

This is a continuation in part of Ser. No. 08/183,384, filed Jan. 13, 1994, allowed Sep. 20, 1994 and now issued as U.S. Pat. No. 5,404,574.

FIELD OF THE INVENTION

This invention relates to wireless/cellular radiotelephone systems and an apparatus and method for the assignment of radio frequency (RF) spectrum channels to the different cells within a wireless communication system for optimizing utilization of the available overall radio spectrum.

BACKGROUND OF THE INVENTION

The service area of a wireless communications system is partitioned into connected service domains known as cells, where radio telephone users communicate, via radio links, with the base station serving the cell. The base station (BS) is coupled to the land network. Efficient use of the available radio frequency spectrum is achieved through the reuse of the same radio frequencies in designated co-user cells that are sufficiently separated by distance so that the combined interference generated by all cells is below tolerable levels. The assignment of radio frequencies to cells has been based on regularity assumptions (i.e., equal-sized regularly-spaced cells with uniformly distributed traffic loads), which enable the adoption of simple rules for identifying co-user cells, and for partitioning the RF spectrum into channel sets. When the regularity assumptions do not hold—as is frequently the case in real world situations—the rules of regular channel assignment do not lead necessarily to the efficient utilization of the RF spectrum, if they can be applied at all. To optimally utilize the RF spectrum one must solve the non-regular channel assignment problem.

SUMMARY OF THE INVENTION

Therefore a channel assignment system, embodying the principles of the invention, assigns channels to a group of cells of arbitrary shape, size, and/or location, by the optimal partitioning of the available radio frequencies into non-overlapping sets, the optimal grouping of co-user cells, and the best assignment of the former to the latter. The objective is the maximization of traffic handling capacity. Given the multitude of cells, the objective may be expressed as the maximization of the bottleneck capacity ratio that can be sustained at a satisfactory blocking rate, interference level, and other system constraints, which is the lowest capacity ratio across all cells. The bottleneck capacity ratio is known as the capacity factor. A capacity ratio for a cell is defined as the ratio of the number of radio frequencies assigned to the cell over the number of radio frequencies needed to meet blocking probability requirements. The latter is fixed once the traffic loads and desired blocking are specified. The maximization of the capacity factor is used in the discussion below as an example. Other measures of utilization efficiency of the RF spectrum may also be employed.

A channel assignment can adapt to traffic distribution changes over time by recomputation of the optimal channel assignment based on traffic estimates derived from the observed traffic loads. statistical differences may be determined from real time measurements of traffic load and used for rearranging channel assignments. An assignment of channels to cells based on an expected traffic distribution does not imply an exclusive relationship between them, as shown in detailed description below. Available channels not assigned to a particular cell can be borrowed by that cell if it has a present need for added channel capacity and provided that the interference and other system constraints are satisfied.

The solution of the optimal non-regular channel assignment is decomposed, according to the invention, into two mathematical programs designated as a Master Program and a Subprogram. These are solved iteratively. A channel set augmentation technique may be implemented between solutions of the Master and Subprogram in order to speed up the solution procedure.

In an illustrative embodiment, a cell having exhausted its available assigned channels may borrow a channel that is not assigned to the cell to satisfy capacity.

While the illustrative embodiment herein is characterized in terms of frequency assignments, it is to be understood that the same techniques may be applied to code assignments in a CDMA system and time slot assignments in TDMA systems. It is not believed necessary to describe these alternative arrangements herein.

DETAILED DESCRIPTION

Figure 1:
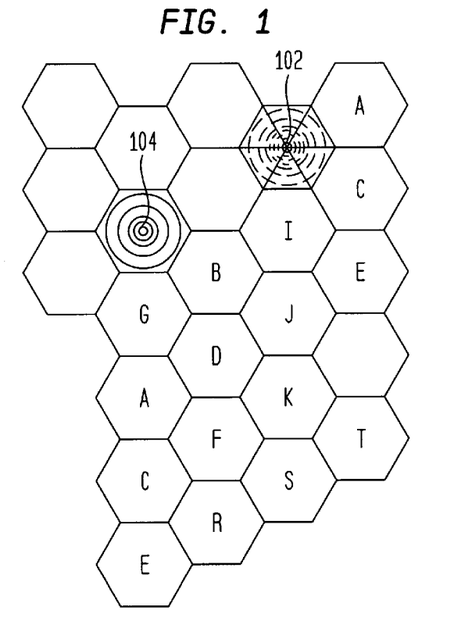
FIG. 1 is a schematic of a regular cell area layout of a wireless/cellular radiotelephone system.

A conventional regular hexagonal cell layout, of a cellular radiotelephone system, is shown in schematic form in FIG. 1. Depicting the geographical service area in terms of a hexagonal grid sets a geometric pattern that allows frequencies to be assigned in a patterned disposition that allows the reuse of these frequencies in a controlled repeatable regular assignment model. The cell areas each have specific channel sets assigned to them. Each channel set comprises a plurality of individual transmit and receive radio channels for use within the cell area. In this model, shown in FIG. 1, cells marked "A" are co-user cells and all use the same channel set. The same is true for co-user cells marked "B", "C", etc., each of which have their own assigned channel set.

Each cell is radiated by an antenna system associated with a base station (BS), that includes the radio transceivers and which are in turn connected to the public switched telephone network (PSTN) via trunk lines or suitable equivalent.

Antennas 101 are either omni-directional or directional. Directional antennas 102 are used to sectorize cells into smaller angular wedge type serving areas.

Figure 2:
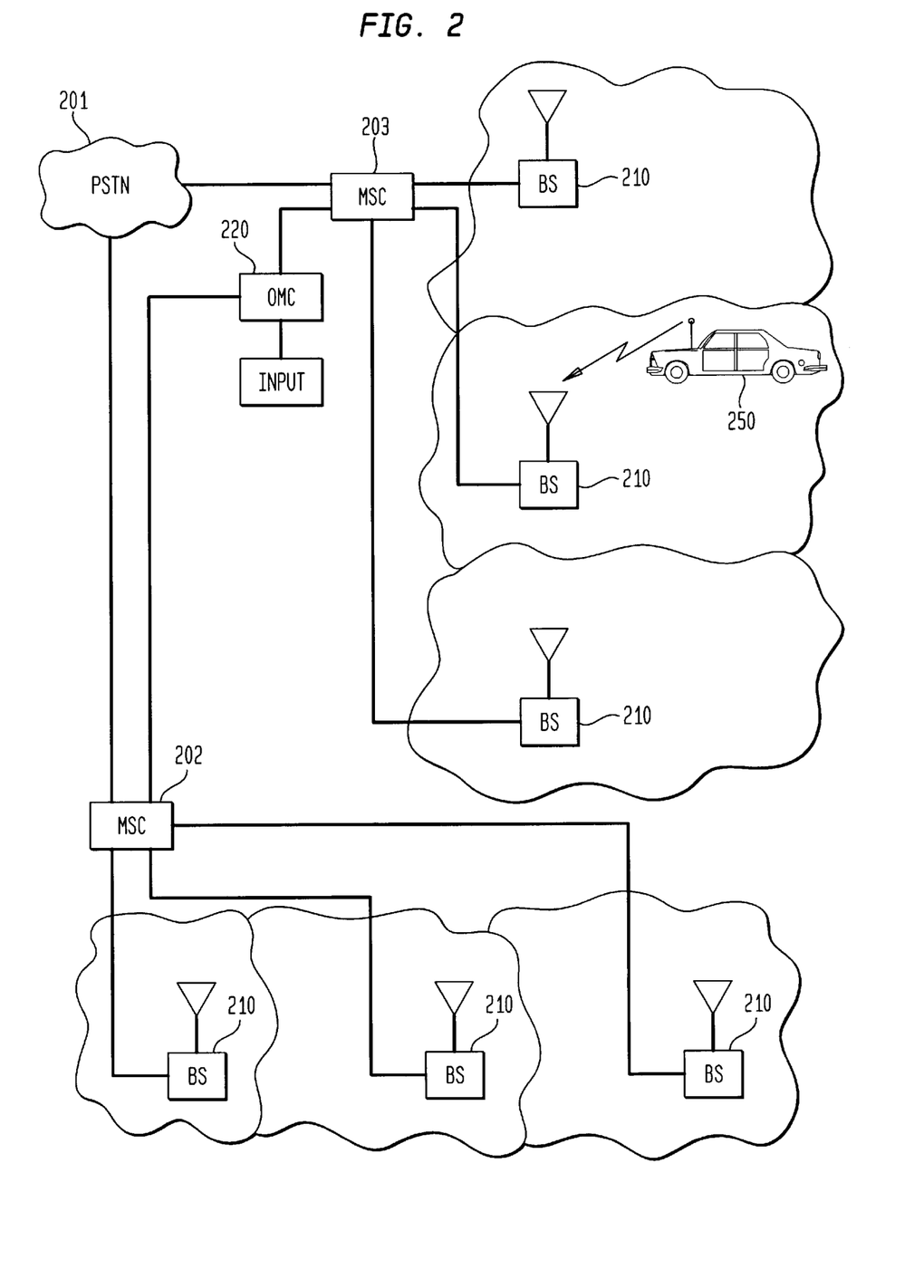
FIG. 2 is a block schematic of a wireless/cellular radiotelephone system.

A typical cellular system is shown in the block diagram of FIG. 2. A plurality of mobile switching centers (MSC), 202 and 203, are shown connecting the mobile radiotelephone system to the public switched telephone network 201 (PSTN). The switching of the MSCs interconnects a plurality of base stations (BS) 210 each providing service to a cell coverage area. Each coverage area is shown as having irregular boundaries typical of an actual system. Each BS has radio transmit/receive equipment and radiating antennas to serve mobile radiotelephones 250 within its cell coverage area.

An operations and management center (OMC) 220 is coupled to the MSCs 202 and 203 to control their system operation and their associated BSs 210. OMC 220 is a central control station which includes data processing equipment and input for accepting data input from data storage and real time control. This data processing arrangement may be utilized in implementing channel assignments in combination with remotely tunable radio transceivers located at the BSs.

Figure 3:
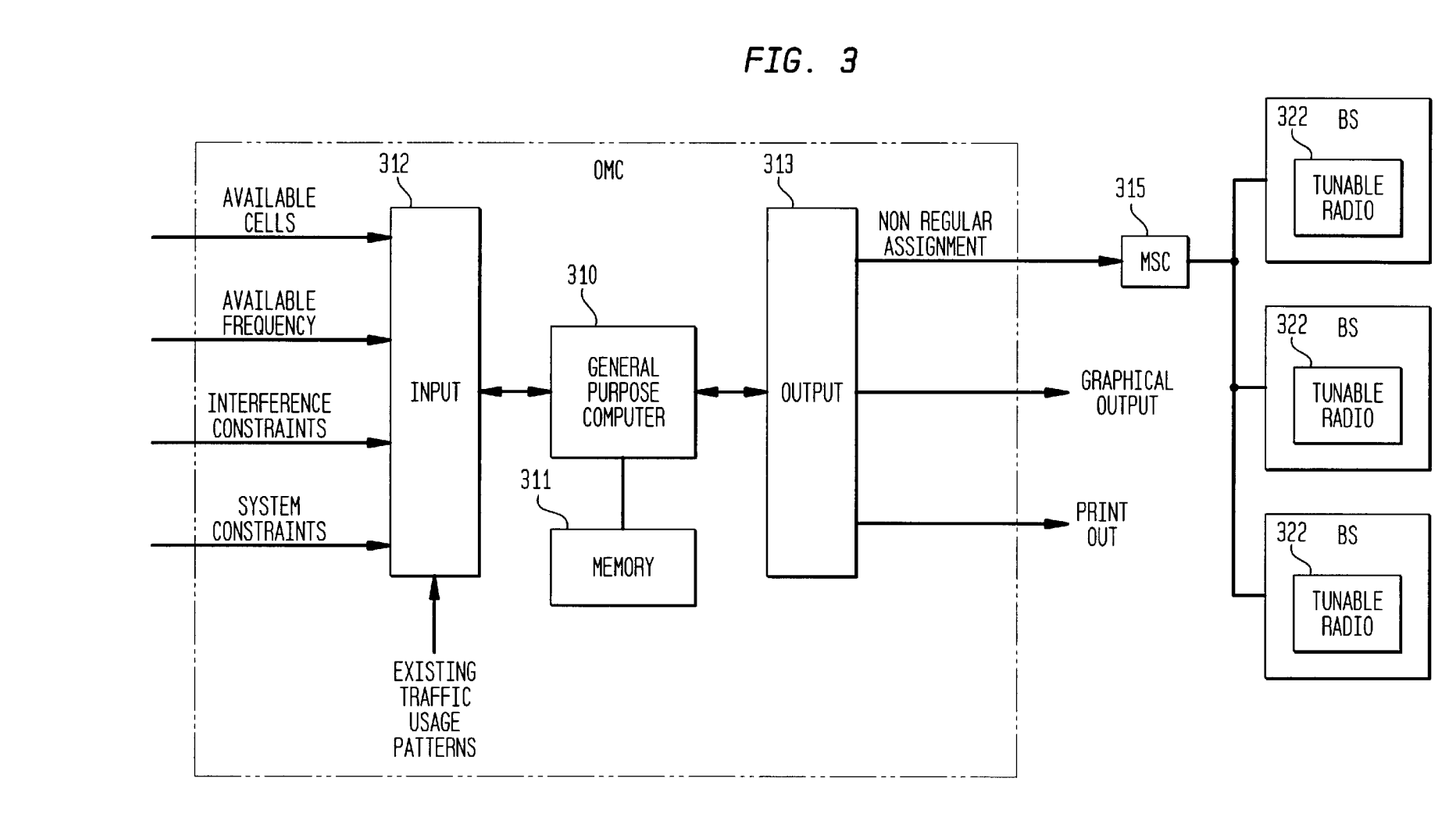
FIG. 3 is a block schematic of a data processing system for assigning radio channels to various cells of a wireless/cellular radiotelephone system.

An illustrative embodiment of data processing equipment included in the OMC for controlling the assignment and tuning of radio transceivers at the BSs is shown in block schematic form in the FIG. 3. A general purpose computer 310 has a stored program included in its memory 311. This program includes instructions for performing the non-regular assignment of radio channels to a cellular system as disclosed in further detail below. Initial input data is supplied through the input circuit 312 to the computer 310. Inputs include the available cells. The available radio frequencies, the channel bandwidth, and filter characteristics are also input into the computer 310. Further inputs include parameters describing the statistical behavior of interference between users and base stations in different cells, and the statistical distribution of the serving signal in each cell. These parameters may be estimated from signal strength measurements. The inputs may also include system constraints necessary for the desired channel assignment. Traffic usage patterns are supplied as an input. Traffic may be measured in real time.

In this illustrative embodiment of the invention, the assignment process is performed in the computer 310 according to the instructions contained in memory 311. The resulting non-regular assignment is output via the output 313 to the MSC 315 and is in turn forwarded to the BSs 321. The individual tunable radios 322 included in the BSs are tuned to the proper frequencies in accord with the assignment of radio channels determined by the assignment process. Added output leads permit graphical and data printouts at the OMC.

During borrowing, each cell will exhaust its allotted channels first before requesting an additional borrowed channel. If, however, it needs additional channels, it may borrow unused additional channels not assigned to itself, provided that system and interference constraints are not violated. Because of borrowing, an idle channel may not be usable in its assigned cell if it has been borrowed by a nearby cell. Therefore, the interference and other system constraints must be checked even when a cell uses its allotted channels. If imposed, an additional constraint that would need to be checked during borrowing is the requirement that a portion of the channels allotted to a cell must be reserved for use by that cell. This portion of reserved channels, which may change in real time, may depend on the number of busy channels plus the number of channel requests denied in the cell, or various other system performance measures. When a cell reserves a channel, the cell must be treated as a current user of the channel when checking compliance with interference and other system constraints before using this channel elsewhere. A borrowed channel is released by the using cell as soon as one of the cell's allotted channels becomes available (due to a call termination or a hand-off). If channel rearrangement is not desirable at this point, the borrowed channel is released upon termination or hand-off of the call it serves.

To state a simple example of the above general assignment problem algebraically, the following notation is utilized. Let $j = 1, \ldots, J$     index of different logical cells (A logical cell is the portion of the coverage area of a cell served by a logical face.)

$i = 1, \ldots, J$     same as $j$ (the combination $(i, j)$ designates a pair of logical cells)

$y_j$     number of channels needed in logical cell $j$ to meet blocking requirements $N$     number of available channels $I_{ij}$     interference contribution by logical face $i$ to logical cell $j$ $S_j$     signal strength of logical face $j$ $T$     threshold level of the signal-to-interference ratio The unknown quantities of the problem are:

$g$     capacity factor (bottleneck capacity ratio)

$K$     number of channel sets $N_k$     size of channel set $k$ $x_{kj} \begin{cases} 1 & \text{if logical cell } j \text{ is covered by channel set } k \\ 0 & \text{otherwise} \end{cases}$ The channel assignment can be expressed as a mathematical programming problem of the form: Maximize g $$\text{Subject to:} \sum_k x_{kj} N_k \geq y_j g \text{ for } j = 1, \ldots, J \quad (1)$$

$$\sum_k N_k \leq N \quad (2)$$

$$\text{Prob}\left[\sum_{i \neq j} I_{ij} x_{ki} \leq \frac{S_j}{T} + M(1 - x_{kj})\right] \geq 1 - \alpha \quad (3)$$

for $j = 1, \ldots, J$ and $k = 1, \ldots, K$ $x_{kj} = 1, 0$ $N_k \geq 0$, integer where M is a large positive number.

The constraints in (1) allocate channels to logical cells in proportion to the cells' requirements. In constraint (2) the total number of assigned channels is limited to the number of channels available. Constraint (3) ensures that the ratio of signal strength to interference is above the desired threshold value with confidence level 1-α. Constraint (3) may be written to include neighbor-channel interference. This constraint may be repeated for different confidence levels 1-α and the corresponding threshold values T. The above formulation of the channel assignment problem can accommodate additional constraints that would reflect a user's special needs. Examples of such constraints are discussed herein below in a discussion of the solution procedure for the basic formulation.

The above problem is a large scale nonlinear mixed-integer stochastic mathematical program. If, for example, a cellular grid has 210 logical cells (70 cell sites, with 3 logical faces per cell site), and 200 channel sets are considered, there would be 42,211 constraints and 42,200 integer variables (excluding slack variables), of which 42,000 would be binary.

This problem is decomposed into two computationally tractable parts using generalized linear programming. The original problem is decomposed into two smaller problems which are solved one after the other in an iterative sequence, exchanging their respective solutions, until the optimal solution is reached. Following established convention, the two problems are called the Master Program and the Subprogram. The Master Program consists of all but the stochastic constraints in (3), which make up the Subprogram constraints.

Figure 4:
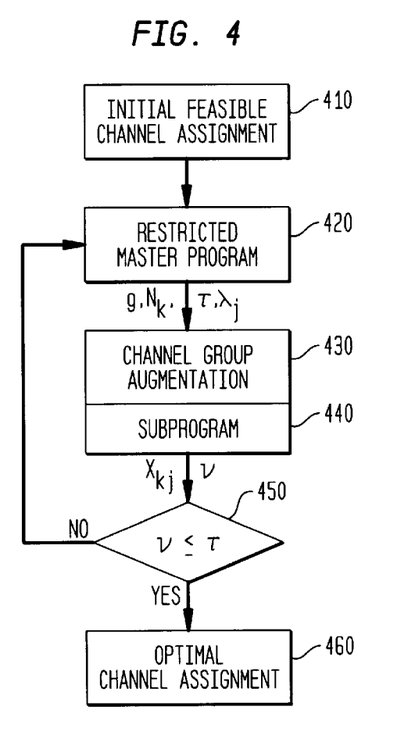
FIG. 4 is a flow process diagram of a method for assigning channels to various cells of a wireless/cellular radiotelephone system.

The algebraic formulation of the Master Program and Subprogram are expressed as follows. The following expressions define the Master Program of block 420 subsequently discussed with respect to FIG. 4:

$$\text{Maximize } g$$

$$\text{Subject to: } \sum_{\text{all available } k} x_{kj} N_k \geq y_j g \text{ for } j = 1, \ldots, J \quad (4)$$

$$\sum_{\text{all available } k} N_k \leq N \quad (5)$$

$$N_k \geq 0, \text{ integer}$$

where $x_{kj}$ are constants satisfying the interference conditions. These values are supplied by the Subprogram described below.

The Subprogram contains the constraints assuring that the ratio of signal strength to interference is above a desired threshold value. Its objective coefficients are the simplex multipliers corresponding to constraints (4) of the Master Program.

The Subprogram has the following form:

$$\text{Maximize } v = \sum_j \lambda_j x_j$$

$$\text{Subject to: } \text{Prob}\left[\sum_{i \neq j} I_{ij} x_i \leq \frac{S_j}{T} + M(1 - x_j)\right] \geq 1 - \alpha \quad (6)$$

$$\text{for } j = 1, \ldots, J$$

$$x_j = 1, 0$$

where $\lambda_j$ is the simplex multiplier corresponding to the $j^{th}$ constraint in (4).

The collection of channel sets included in the Master Program is comprised of all the solutions of the Subprogram. The $k^{th}$ solution of the Subprogram provides values for the binary variables $x_{kj}$. A channel set is defined in terms of the co-user cells it serves. The collection of channel sets grows with every new solution of the Subprogram, and this growth helps improve the Master Program solution. Growth in the collection of channel sets stops when the optimal solution is reached.

The overall structure of the assignment process comprising the Master Program and Subprogram is shown in the FIG. 4. The solution procedure, as shown in the flow process in FIG. 4, involves four major functions. These are: Channel Assignment Initialization (block 410), a Master Program Solution (block 420), Channel Set Augmentation, and Subprogram Solution (closely related blocks 430 and 440). In the first function, block 410, which is the initialization of the channel assignment, a feasible channel assignment is obtained before we proceed with the optimization. If the model is applied to an existing grid, the present channel assignment can serve as the initial channel assignment, provided it satisfies all system constraints. If it violates any of the constraints, it is modified by the Initial Channel Assignment algorithm, as described below, to meet all constraints.

Once an initial feasible channel assignment has been obtained, the remaining three functions are executed in an iterative sequence. First comes the solution of the Master Program in block 420, whose solution furnishes the system values of g, $N_k$, τ, and $\lambda_j$. τ is a simplex multiplier corresponding to constraint (5) and $\lambda_j$ is a simplex multiplier corresponding to the jth constraint in (4). This information is used by the Channel Set Augmentation algorithm in block 430 which invokes the Subprogram Solution algorithm in block 440 several times in order to generate new channel sets.

The Channel Group Augmentation algorithm is an optional heuristic process that enhances solution of the problem. It revises the values of $N_k$ and $\lambda_j$, which are used in the next solution of the Subprogram. The Subprogram solution furnishes the values of v and $x_{kj}$.

Once a specified number of channel sets has been generated, optimality is checked as prescribed in decision block 450. If the solution is optimal as determined in decision block 450, the algorithm terminates and the assignments are provided in block 460. Otherwise, the cycle repeats again with the solution of the restricted Master Program in block 420.

The following condition indicates optimality: Let K-1 be the current cycle, and let $x_{Kj}$ be the optimal solution of the new Subprogram. Let τ be the simplex multiplier corresponding to constraint (5) of the relaxed Master Program. If $$\sum_j x_{Kj} \lambda_j \leq \tau \quad (7)$$

then the current solution is optimal for the relaxed Master Program.

The solution procedure described herein is finite as the number of different channel sets is finite, and each solution of the Subprogram contributes a new channel set to the Master Program. That the channel set entering the Master Program at each cycle is new is based on the following observation. The simplex multipliers of the relaxed Master Program at cycle K-1 satisfy the conditions: (5)

$$\sum_j x_{kj}\lambda_j - \tau \leq 0 \text{ for } k = 1, \ldots, K-1 \qquad (8)$$

If the new Subprogram solution $x_{Kj}$ is added to the Master Program, it cannot meet the condition in (7), for that would lead to the termination of the process. Since it violates the requirement in (7) it cannot be identical to any of the K−1 solutions encountered previously, by condition (8). Hence, $x_{Kj}$ represents a new channel set. Given that the number of cells in a grid is finite, the number of distinct cell groupings that represent different channel sets is also finite. Hence, the solution procedure is finite.

The solution procedure must start with a feasible channel assignment, that is a channel assignment that covers all cells and meets the channel availability constraint and co-channel interference constraints. For an existing cellular grid, the channel assignment in place may serve as the initial channel assignment, provided it is feasible. If the existing channel assignment is not feasible (infeasibility would arise typically from the violation of the interference constraints), or if there is no existing channel assignment, it is necessary to generate an initial feasible channel assignment.

Figure 5:
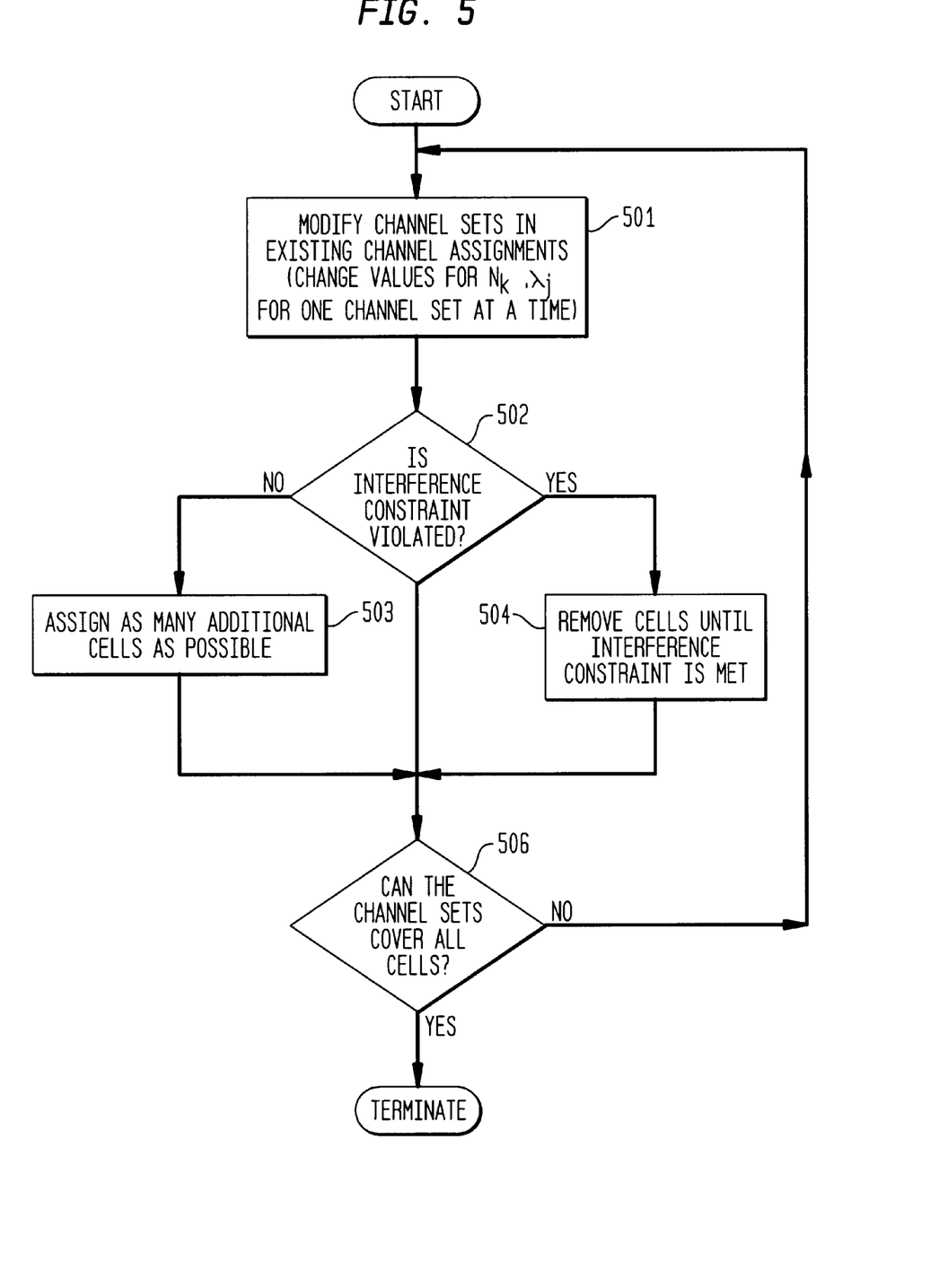
FIG. 5 is a flow process diagram of a method for making initial feasible channel assignments.

The method for deriving an initial channel assignment is based on a variation of the Channel Group Augmentation algorithm. In the most general case, as shown in FIG. 5, the existing channel assignment violates the interference constraints. In this case, Channel Assignment Initialization consists of two phases. In Phase I we modify (Block 507) the channel sets in the existing channel assignment, one at a time by changing values for $N_k$ and $\lambda_j$. If a channel set violates the interference constraint (decision Block 502), cells are removed (Block 504) until it satisfies the interference constraint. If the interference constraint is met by an existing channel set, the algorithm will assign as many additional cells as possible (Block 505), provided that the interference constraint is satisfied. If the resulting channel sets cannot cover all cells, the second phase is implemented. In Phase II additional channel sets are generated until all cells are covered (Block 506).

Both phases employ the Channel Set Augmentation algorithm. They differ in terms of the initial values used for $\lambda_j$. In Phase I, $\lambda_j$ equals 1 for all cells j covered by the existing channel set, and zero for the remaining cells. In Phase II, $\lambda_j$ is computed by the equation (10) disclosed herein below.

The Master Program is a linear program involving the integer variables $N_k$, which assume values ranging from 0 to N—the number of available frequencies, a number which is normally between 300 and 400. Various techniques may be used to obtain an integer solution. Given the magnitude of the integer variables, one can obtain near-optimal solutions to this mixed-integer linear program by solving the relaxed linear program without the integer requirements as per Block 601 in FIG. 6. For the purposes of channel assignment, integer solutions must be provided.

Figure 6:
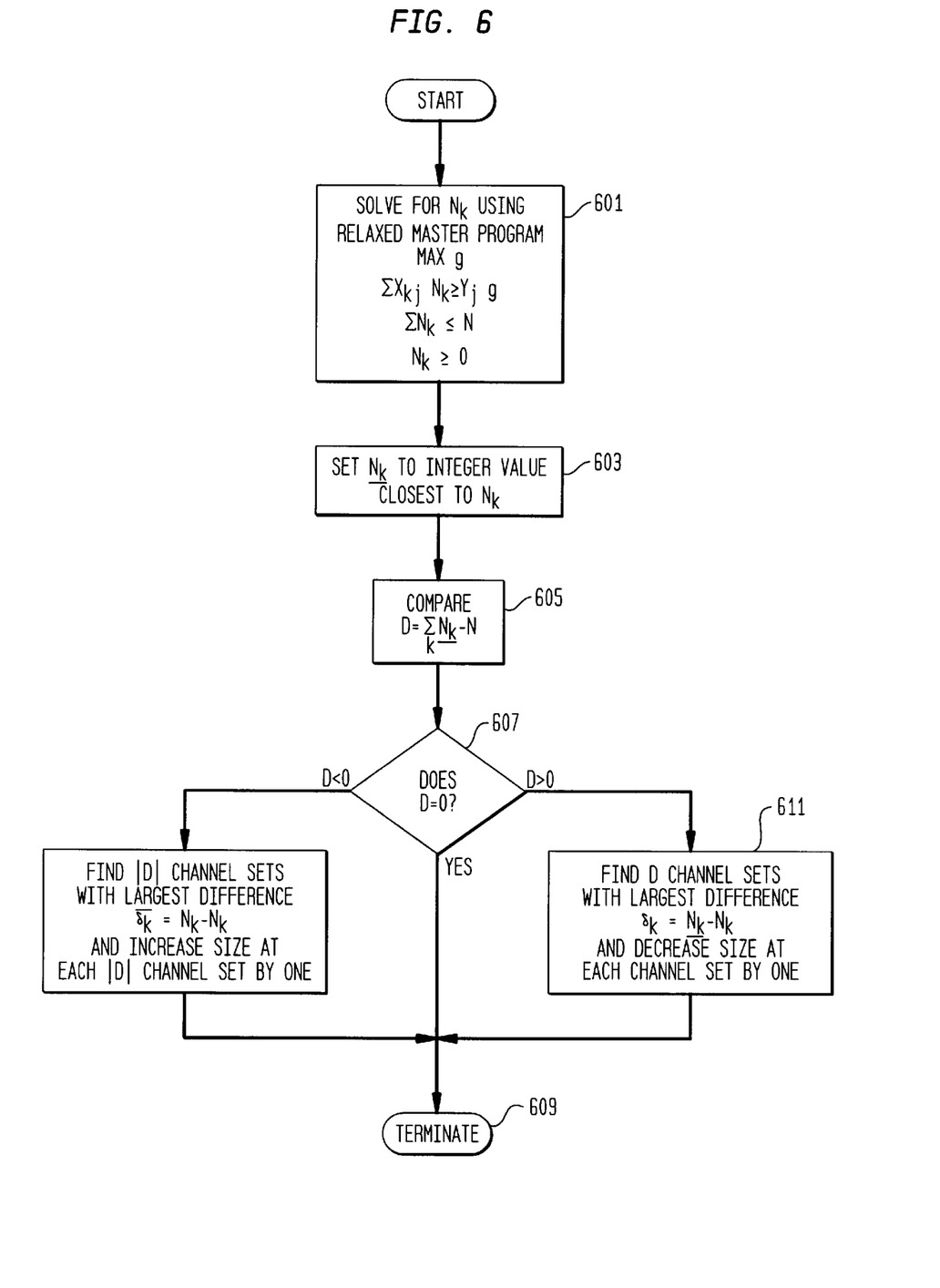
FIG. 6 is a flow process diagram of a method for providing an integer solution for the Master Program.

The algorithm yielding an integer solution to the Master Program shown in FIG. 6 uses the fact that the optimal channel assignment will use all of the N available channels. Given an optimal solution to the relaxed problem (the linear program without the integer requirements), the algorithm starts by making the channel set sizes equal to the integers closest to the relaxed solution (Block 601). It terminates if the integer set sizes add up to N (Blocks 605, 607, 609). If not, it increases (or decreases) by 1 the sizes of the channel sets with the greatest positive (or negative) deviation from the optimal non-integer value (Blocks 611, 615). The steps of the algorithm are shown in the FIG. 6 and are described below in detail.

The term $N_k$ denotes the channel set sizes in the optimal solution, and by $\underline{N}_k$ their closest integers. The procedure for obtaining an integer solution to the Master Program is outlined in FIG. 5 as follows:

Step 1   Set $\underline{N}_k$ equal to the integer to $N_k$. (Block 603)

Step 2   Compute the difference $D = \sum_k \underline{N}_k - N$. (Block 605)

If D = 0, terminate (Block 607). Otherwise go to Step 3.
Step 3   If D < 0, go to Step 5. Otherwise go to Step 4. (Block 607)
Step 4   Find D channel sets with the largest difference $\delta_k = \underline{N}_k - N_k$. Decrease the size of each of the D channel sets by 1. Terminate. (Blocks 611, 613)
Step 5   Find |D| channel sets with the largest difference $\overline{\delta}_k = N_k - \underline{N}_k$. Increase the size of each of the |D| channel sets by 1. Terminate. (Blocks 615, 617)

It is easy to verify that, given a non-negative solution to the relaxed linear program, the resulting integer solution will also be non-negative.

Once the complexity caused by the integer constraints has been removed, the solution of the Master Program becomes straightforward. Standard linear programming software can be used. By linear programming standards, the relaxed Master Program is a relatively small linear program, having a number of constraints equal to one plus the number of logical cells in the grid, and number of variables equal to one plus the number of channel groups. It is expected that a large grid would have no more than 500 logical cells. Seven hundred and fifty channel sets would more than exceed the number needed to yield an optimal solution.

The number of cycles of the Master Program may be reduced by generating lists of channel sets with the channel group augmentation heuristic. One of the factors contributing to the computational effort in mathematical programming decomposition is the repeated solution of the Master Program. Since the optimal channel assignment is derived from the last Master Program solution, and all previous Master Programs serve only to generate a list of desirable candidate channel sets, generating a larger number of candidates at each cycle would tend to reduce the number of Master Program solutions while still yielding an optimal solution. Therefore, between any two consecutive solutions of the Master Program, the method used generates several new channel sets. The number to be generated is specified by the user.

The criterion used in generating new channel sets is that they must have the potential to improve the Master Program objective value. The first channel set generated after the solution of the $K^{th}$ Master Program has this potential since it has a negative reduced cost by condition (7). In order to obtain heuristically additional channel sets with a negative reduced cost, the simplex multiplier $\lambda_j$ is needed. Typically, $\lambda_j$ is supplied by the solution of the Master Program. Since our aim is to generate more than one channel set between consecutive solutions of the Master Program, it is necessary to revise the $\lambda_j$ values before each Subprogram solution without re-solving the Master Program.

The revision of $\lambda_j$ is based on properties that would hold if the Master Program were solved. They are derived from the following Complementary Slackness conditions defined by equation (9):

$$\lambda_j \left( \sum_{k=1}^{K} x_{kj} N_k - y_j g \right) = 0 \quad \text{for } j = 1, \ldots, J \quad (9)$$

A consequence of the above conditions is that the simplex multiplier $\lambda_j$, which is required to be non-negative, will be positive only if the corresponding primal constraint in equation (1) is binding or, equivalently, whenever the capacity ratio of cell j equals the grid capacity factor. We refer to such a cell as a binding cell.

The condition of equation (9) is employed to update the $\lambda_j$ values of binding cells as follows. A new channel set K, derived from the last Subprogram solution, will receive in the next iteration a portion of the available channels. This implies that if set K covers cell j, cell j will typically not be binding in the next iteration. By equation (9), the corresponding simplex multiplier $\lambda_j$ would become zero. Hence, the following revision rule is used:

$$\lambda_j = \begin{cases} 0 & \text{if } x_{Kj} = 1 \\ \text{unchanged} & \text{if } x_{Kj} = 0 \end{cases} \quad (10)$$

This revision causes channel sets generated by subsequent solutions of the Subprogram to favor binding cells that were not covered by the last channel set, as they will have positive $\lambda_j$ values.

The above revision rules deal with the binding cells as they become non-binding. Rules are needed also for the cells that are not binding in the Master Program solution but, as new channel sets are added, may become binding. Such cells should be covered by subsequent channel sets. With $\lambda_j$ assigned zero value by equation (9), however, they do not have a chance, unless $\lambda_j$ is updated. An alternative way is to communicate to the Subprogram the binding status of a cell by handing over the new channel set sizes $N_k$. The Subprogram considers the binding status of a cell together with simplex multiplier $\lambda_j$ values in deriving a new channel set.

There are several ways to revise $N_k$. In this implementation of the algorithm we assume that the new channel set K will receive one $K^{th}$ of the available channels, while the size of the existing K-1 channel sets will be adjusted accordingly. That is, $$N_K = \frac{N}{K} \quad (11)$$

If the existing channel sets had size $N'_k$, their new sizes will be $$N_k = N'_k \frac{(K-1)}{K} \quad \text{for } k = 1, \ldots, K-1 \quad (12)$$

Figure 7:
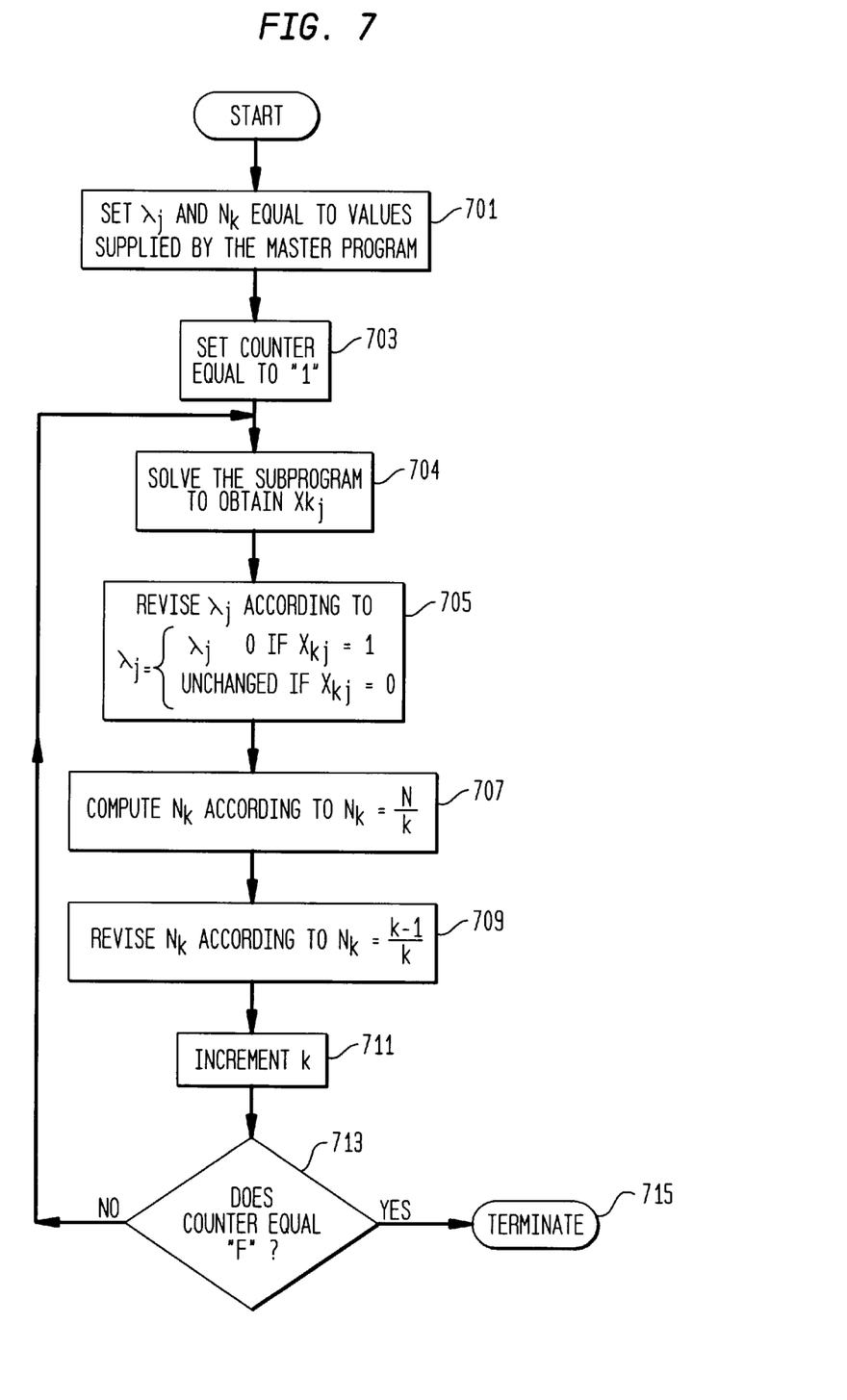
FIG. 7 is a flow process diagram of a method for channel set augmentation.

The algorithm for generating F new channel sets is shown in flow form in FIG. 7.

| Step 1 | Set $\lambda_j$ and $N_k$ equal to the values obtained by solving the Master Program. (Block 701) |
|---|---|
| Step 2 | Repeat Steps 3 through 6, F times. (Blocks 702, 713) |
| Step 3 | Solve the Subprogram to obtain $x_{kj}$. (Block 704) |
| Step 4 | Revise $\lambda_j$ by equation (10). (Block 705) |
| Step 5 | Compute $N_K$ by equation (11) (Block 709), and revise $N_k$ for k = 1, . . ., K − 1 by equation (12). (Block 711) |
| Step 6 | Increment K. (Block 711) |

Given the difficulty of pursuing a globally optimal solution method, we have devised an efficient heuristic algorithm for the solution of the Subprogram. It constructs a solution by selecting among the cells in the grid those that will maximize the Subprogram objective value without violating the interference constraints of equation (6). Such a set is constructed by adding one cell at a time, giving priority to the cells with the greatest $\lambda_j$ value. A cell can be added to the set if it does not interfere with the cells already in the set. For cells with equal $\lambda_j$ values the order in which cells are considered is important because the inclusion of one cell might preempt, through the interference it generates, more cells than another. Preference is given to cells with low pre-emptive potential. The pre-emptive potential would change at each step, as new cells are added to the set. Therefore, the criterion function used for including a cell in the solution is updated after the addition of each cell.

The algorithm logic can be described as follows. At each step, the cells are partitioned into three subsets. The set C, which consists of the cells included in the solution (i.e., $x_j$=1); the set $\overline{C}$, which consists of the cells excluded from the solution (i.e., $x_j$=0); and the set U, which consists of the cells whose fate has yet not been determined. At the start of the algorithm, U contains all the cells, and C and $\overline{C}$ are empty. At each step a member of U is placed in C. Its inclusion in the solution may pre-empt other members of U from inclusion. The preempted members of U are moved to $\overline{C}$. The algorithm terminates when U becomes empty.

Among cells with equal $\lambda_j$ values, the cell to be moved from U to C is chosen based on its potential to block other members of U from entering C. There are several ways to measure this potential. In the implementation described in this paper we define the pre-emptive potential function $p_j$ as the inverse of the "slack" $a_j$ in the interference constraint in equation (6), which measures the margin for additional contributions to the interference experienced in cell j.

$$p_j = \frac{1}{a_j} \quad (13)$$

The solution of the Subprogram may be expanded to include cells with zero $\lambda_j$. This is necessary in order to deal with the non-binding cells that become binding as more channel sets are generated. In some instances, the inclusion of the largest possible number of cells in the solution of the Subprogram may be desirable for the increased system planning flexibility it affords. Hence, cells may be chosen in order of descending value of the following criterion function $f_j$:

$$f_j = \lambda_j - \varepsilon \left( \frac{\sum_{k=1}^{K} x_{kj} N_k}{y_j} \right) - \varepsilon^2 p_j \quad (14)$$

where K is the last channel set generated, and $\varepsilon$ is a very small positive number.

Given a sufficiently small value for $\varepsilon$, the cells with positive $\lambda_j$ values will be given priority. The remaining cells will be considered only when all cells with positive $\lambda_j$ have been considered. Among cells with positive and equal $\lambda_j$ values, the choice of a cell to be included in set C is based on the pre-emptive potential $p_j$ since, according to condition (9), the capacity ratio in the second term of (14) is the same for all such cells—it equals the grid capacity factor. For cells with zero $\lambda_j$ values, the capacity ratio dominates the choice of a cell to be included into C.

Figure 8:
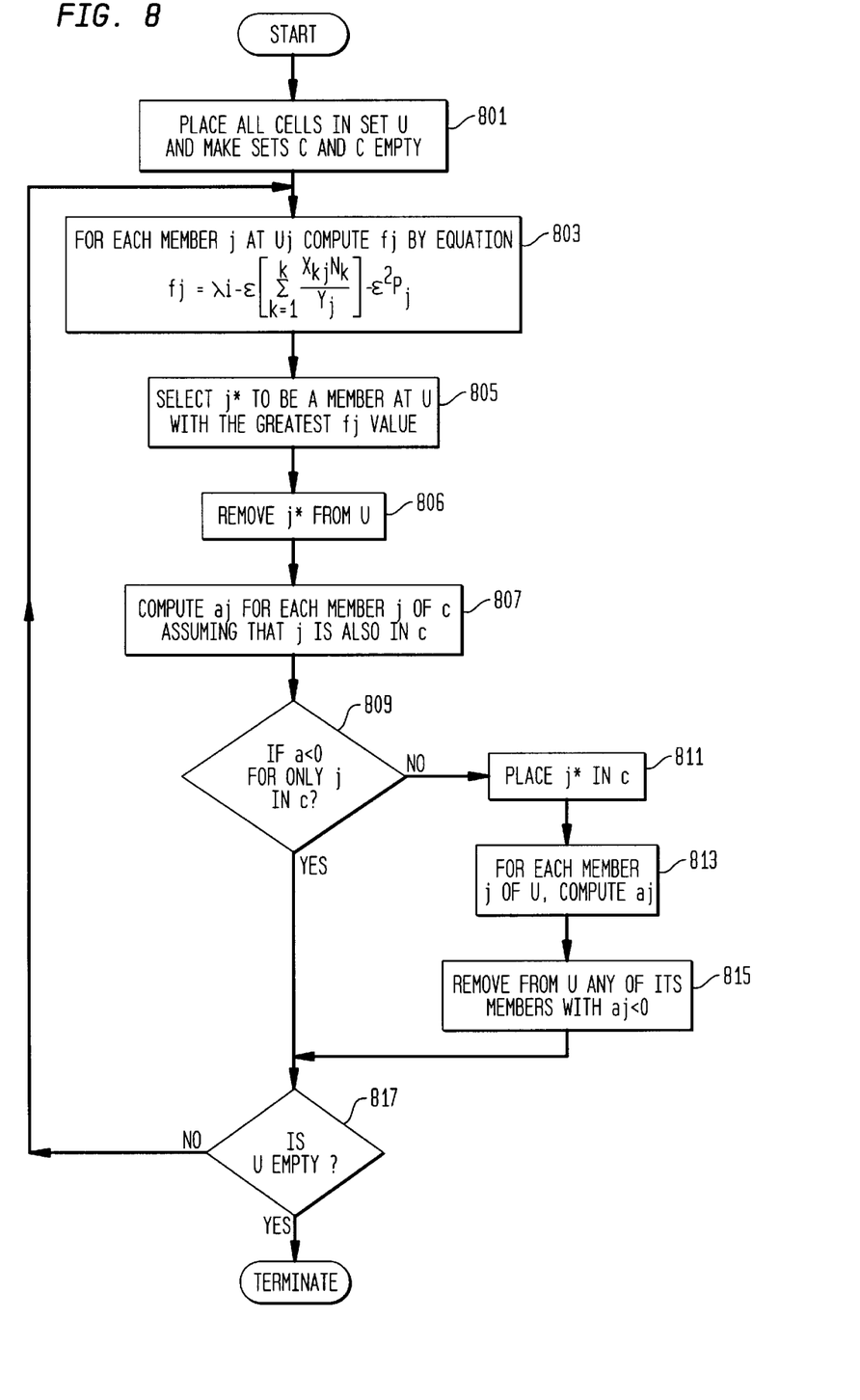
FIG. 8 is a flow process diagram of a method for solution of the Subprogram.

The algorithm for the solution of the Subprogram is shown in flow process form in FIG. 8.

| | |
|---|---|
| Step 1 | Place all cells in set U, and make sets C and $\overline{C}$ empty. (block 801) |
| Step 2 | For each member j of U, compute $f_j$ by equation (14). (block 803) |
| Step 3 | Select j* to be the member of U with the greatest $f_j$ value. (block 805) Remove j* from U. (block 806) |
| Step 4 | Compute $a_j$ for each member j of C assuming that j* (block 807) is also in C. |
| Step 5 | If $a_j < 0$ for any j in C, place j* in $\overline{C}$ and go to Step 8. (block 809) Otherwise, place j* in C (block 811) and go to Step 6. |
| Step 6 | For each member j of U compute $a_j$. (block 813) |
| Step 7 | Remove from U any of its members j with $a_j < 0$ and place them in $\overline{C}$. (block 815) |
| Step 8 | If U is empty, terminate. (block 817) Otherwise, go to Step 2. |

The calculation of the pre-emptive potential $p_j$ in the solution of the Subprogram, discussed above, involves the interference constraint slack $a_j$, which measures the margin for additional contributions to the interference experienced in cell j. The slack will vary with the composition of C, the collection of cells covered by the channel set.

To compute the slack $a_j$ we convert the probability statement of equation (6) into an equivalent deterministic constraint for each cell j in U, the collection of undetermined cells. The constraint in equation (6) can be written as follows:

$$Prob\left[\frac{S_j}{\sum_{i \neq j, \varepsilon C} I_{ij}} \geq T\right] \geq 1 - \alpha \text{ for } j \varepsilon U \quad (15)$$

To write the above as an equivalent deterministic inequality, we need to know the probability distribution of the signal-to-interference ratio. Let Y be the value of this ratio, expressed in decibels. That is, $$Y = 10\log_{10}\left(\frac{S_j}{\sum_{i \neq j, \varepsilon C} I_{ij}}\right) \quad (16)$$

Following other treatments, we assume that Y is normally distributed. Let $\mu_Y$ and $\sigma_Y^2$ be the mean and variance of Y, respectively, and let R be the signal-to-interference ratio threshold value T expressed in decibels. Equation (15) can be written as follows:

$$Prob[Y \geq R] = 1 - Prob\left[z \leq \frac{R - \mu_Y}{\sigma_Y}\right] \geq 1 - \alpha \text{ for } j \varepsilon U \quad (17)$$

where z is a normal random variable. The equivalent deterministic constraint is the following:

$$\mu_Y + z_\alpha \sigma_Y \geq R \quad (18)$$

where $z_\alpha$ is the $\alpha$-quantile of a normal random variable. $a_j$ is the slack variable of the above inequality. Therefore, $$a_j = \mu_Y + z_\alpha \sigma_Y - R \quad (19)$$

The values of $\mu_Y$ and $\sigma_Y$ depend on the composition of set C. They are computed using the assumption that the signals of all antenna faces, when expressed in decibels, are independent normally distributed random variables and that the cumulative interference experienced in cell j is also normally distributed, when expressed in decibels [9]. Let $$Y = P - L \quad (20)$$

where $$L = 10\log_{10}\left(\sum_{i \neq j, \varepsilon C} I_{ij}\right) \quad (21)$$

$$P = 10\log_{10} S_j \quad (22)$$

If $\mu_L$ the mean of the cumulative interference L in cell j, expressed in decibels $\sigma_L^2$ the variance of L, $\mu_P$ the mean of the power signal P in cell j, is expressed in decibels as $\sigma_P^2$ the variance of P then, the mean and variance of Y are given by:

$$\mu_Y = E(Y) = E(P) - E(L) = \mu_P - \mu_L \quad (23)$$

$$\sigma_Y^2 = \text{Var}(Y) = \text{Var}(P) + \text{Var}(L) = \sigma_P^2 + \sigma_L^2 + 2\text{cov}(P,L) \quad (24)$$

$\mu_P$, $\sigma_P^2$, and cov(P,L) may be calculated from analytical models, or estimated based on empirical data, which may accumulate during the operation of the system. $\mu_L$ and $\sigma_L^2$, which vary with the composition of the set C, are computed in each step of the Subprogram Solution algorithm by a power-summing procedure. The statistical parameters employed in the power-summing computation may be calculated from analytical models, or estimated based on empirical data that may accumulate during the operation of the system.

Figure 9:
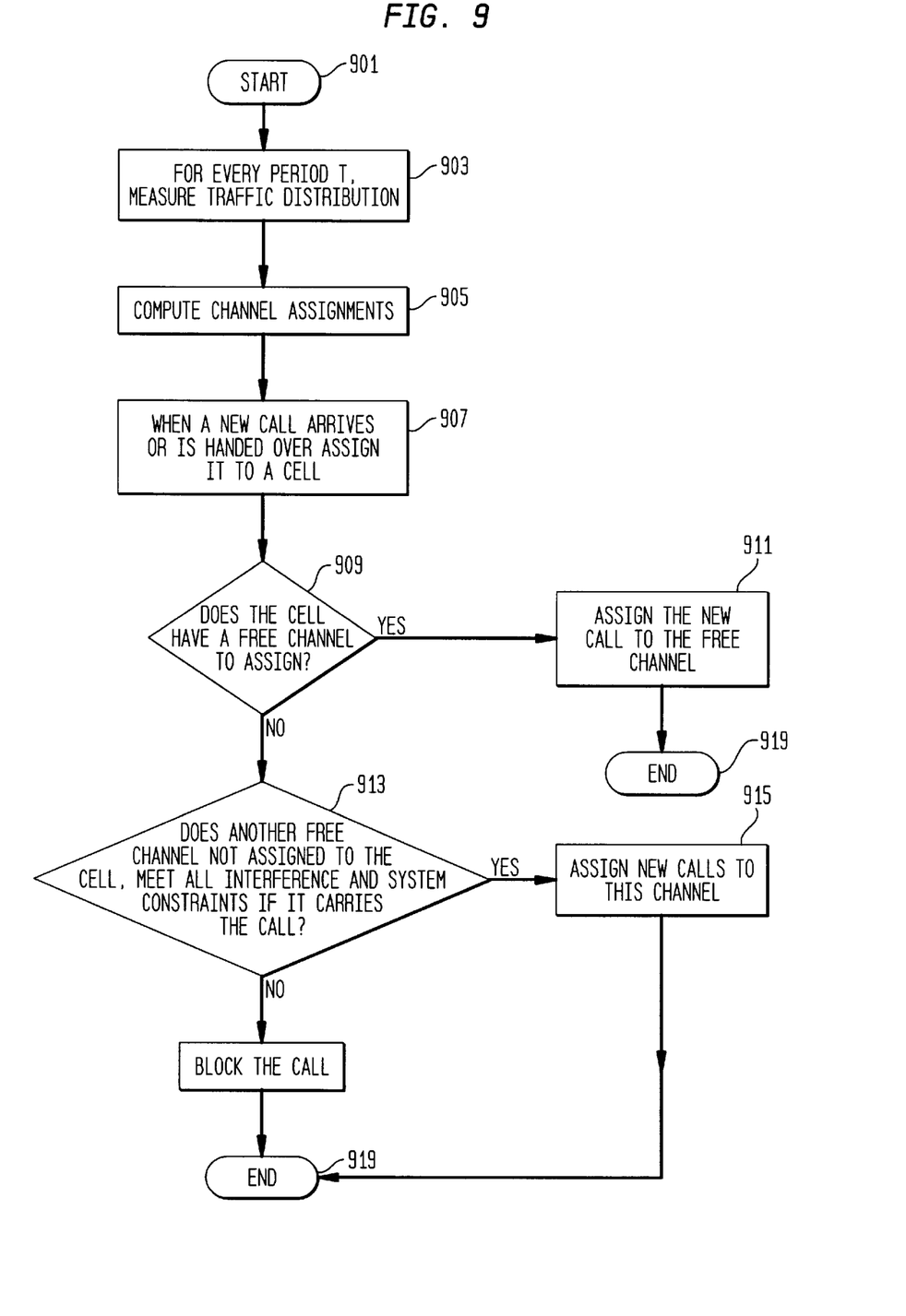
FIGS. 9 and 10 are flow charts disclosing a process for a borrowing a channel from another cell channels to meet random changes in traffic demands.

The process in which unused channels of one cell are borrowed by a cell needing added capacity is illustrated by the flowchart of FIG. 9. The process begins at terminal 901 and in block 903 the instructions call for a periodic measurement of traffic distribution. The instructions of the block 905 replicate the above described computation for computing channel assignment or any other method for computing channel assignments. The occurrence of a channel request on one of the cells as shown in block 907 may find that cell fully subscribed. The decision block 909 determines if there is an available channel from those already assigned to the cell. If there is one, it is assigned to the channel request provided the interference and other system constraints are satisfied. Then, the flow proceeds to block 911 whose instructions assign the call to the free channel and the assignment process ends in terminal 919.

If all channels assigned to the cell are busy within the cell, or borrowed by other cells, the flow proceeds to block 913, which determines if there is a free channel, not assigned to the cell, that would meet a all interference, system, and reservation requirements if assigned to the channel request. If there is one, the flow proceeds to block 915, whose instructions assign the call to the free channel and the assignment process ends in terminal 919.

Figure 10:
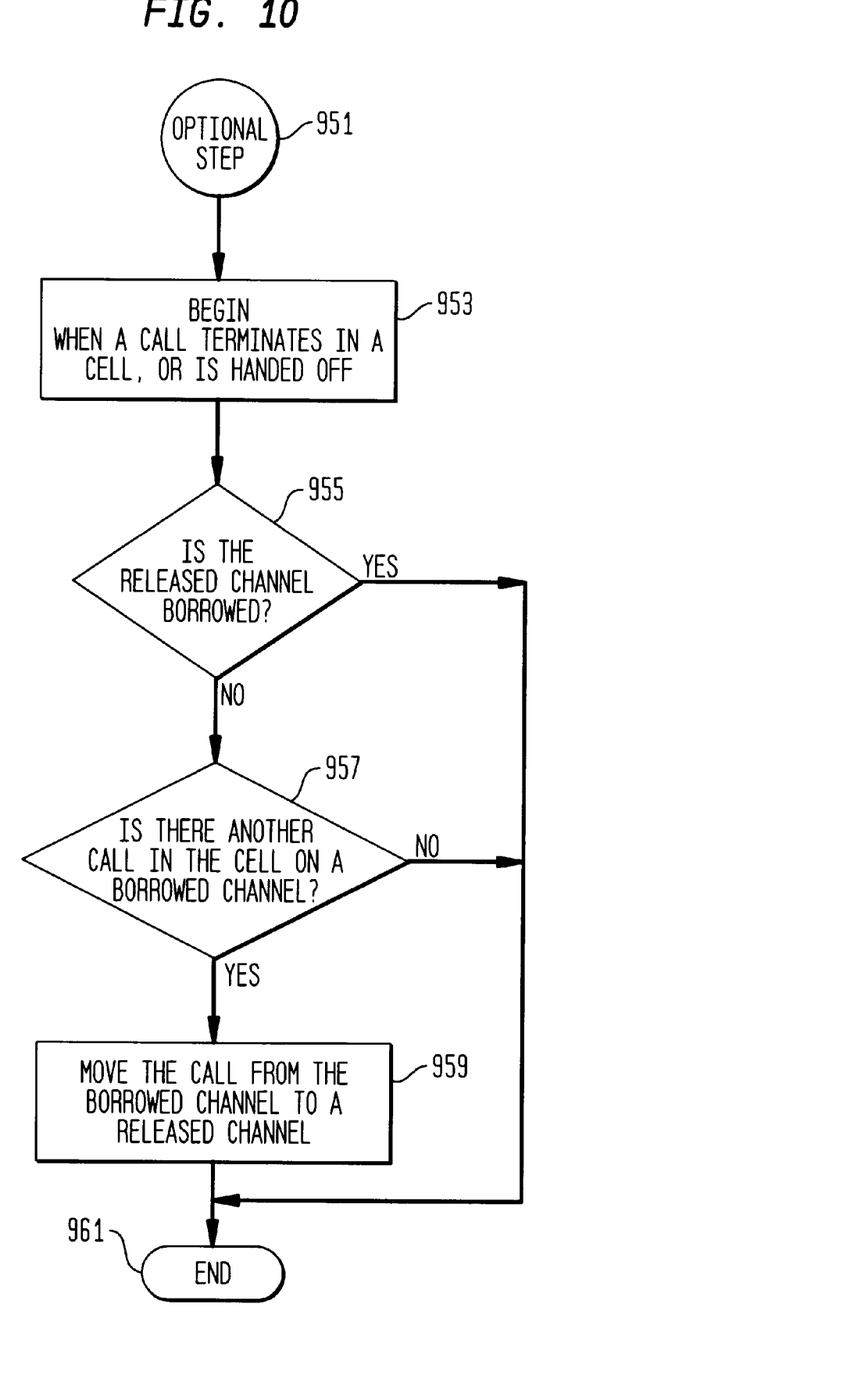

When a channel becomes available a process, illustrated in FIG. 10, controls the disposal of the borrowed channel. The process begins in start terminal 951 and in block 953 which recognizes the termination or handoff of a call. The instructions of decision block 955 inquire if the released channel is a borrowed channel. If it is, the flow terminates in the end terminal 961. If it is not, the decision block 957 inquires if there is another call in the cell using a borrowed channel. The flow ends in the absence of such a call. If a borrowed channel is being used, the call on that channel is transferred to the released channel as shown in block 959. The flow process terminates in the end terminal 961.

The interference constraint checked in channel use and reservation decisions is similar to the interference constraint in equation (6), and its equivalent constraints (15) and (18), but with the following differences. The set C is the replaced by the set C' consisting of the cells actually using the channel when compliance is checked. The confidence level 1−α is replaced by 1−α', which would be typically higher. For example, α could be 0.50 while α' would be 0.10. Finally the probability distribution may be conditional on the observed signal strengths of the interfering and serving signals if their values are available. That is, if the observed serving signal strength of a call requesting a channel in cell j is $S_j'$, and the interfering signal strengths are $I_{ij}'$ for i ∈ C', then the following interference constraint is checked before using the channel in cell j:

$$Prob\left[\frac{S_j}{\sum_{i \neq j, \varepsilon C}} \geq TS_j', I_{ij}'\right] \geq 1 - \alpha'$$

Otherwise, the same (marginal) probability distribution would be used as in constraints (6), (15), and (18), but with α' and C'. C' will include any cells that may have reserved the channel in question for their own use.

A channel assignment is recomputed when the observed offered loads are significantly higher in some cells so as to cause blocking rates in excess of the target values, based on which the channel assignment was computed. A record of the number of blocked and successful calls (or channel requests) is retained for a time interval, thus obtaining an estimate of the load offered to the cell. If the observed offered load is outside a statistically significant range of the offered load used to compute the channel assignments, the channel assignment optimization is invoked to compute a new channel assignment. Otherwise, the present assignment is maintained.

Channel reservation helps the system approach the optimal channel assignment. A simple example of determining the number of reserved channels in real time would be to make this number reflect the deviation between anticipated and realized offered loads. If there is no change in anticipated offered loads since the last channel assignment calculation, the number of reserved channels plus the number of busy channels owned by a cell would be less than the number of channels assigned to the cell.

The invention claimed is:

1. In a wireless communications system having service areas partitioned into a plurality of substantially contiguous cells, wherein another plurality of radio communications channels is available for allocation among said cells, a method for assigning channels to cells comprising the steps of:
   computing an assignment of radio channel sets to the cells;
   apportioning a set of channels assigned to a first cell between a reserved portion and a free portion;
   determining at the time of a channel request from a second cell whether said first cell has channels available from said reserved portion of assigned channels;
   making a dynamic determination as to whether at least one of said available reserved channels of said first cell's assigned channels will meet interference and system constraints for application in said second cell; and
   making a channel from said at least one channel meeting interference and system constraints available for borrowing by said second cell.

2. The method of claim 1 wherein said step of borrowing comprising the further step of:
   employing a higher confidence level (or different parameters in the corresponding deterministic equivalent constraints) when determining said second cell can borrow said channel assigned to said first cell.

3. The method of claim 1 comprising the further steps of:
   changing said reserved portion of assigned channels to be reserved for said cell.

4. The method of claim 1 comprising the further steps of:
   determining if a released channel at the termination of a call is a borrowed channel; and
   transferring an existing call on a borrowed channel to said released channel if said released channel is not borrowed.

5. A method of operating a wireless communications system having service areas partitioned into a plurality of substantially contiguous cells, said method comprising the steps of:
   determining the available cells and available radio channels for the system;
   determining serving signal and interference statistics;
   determining interference and system constraints for the cells;
   determining existing traffic patterns for the cells;
   inputting the cells, channels, serving signal and interference statistics, interference and system constraints, existing traffic patterns and blocking requirements for the cells into a computing device;
   computing an assignment of disjoint sets of available radio channels to the cells;
   apportioning a set of channels assigned to a first cell between a reserved portion and a free portion;
   determining at the time of a channel request from a second cell whether said first cell has channels available from said reserved portion of assigned channels;
   making a dynamic determination as to whether at least one of said available reserved channels of said first cell's assigned channels will meet interference and system constraints for application in said second cell;
   making a channel from said at least one channel meeting interference and system constraints available for borrowing by said second cell; and
   tuning a cell radio in said second cell to the said channel assigned to said first cell.

6. The method of claim 5 wherein said step of borrowing comprising the further step of:
   employing a higher confidence level (or different parameters in the corresponding deterministic equivalent constraints) when determining said second cell can borrow said channel assigned to said first.

7. The method of claim 5 comprising the further step of:
   changing the reserved portion of assigned channels to be reserved for said cell.

8. The method of claim 7 wherein said step of changing occurring in real time.

9. The method of claim 5 comprising the further steps of:
   determining if a released channel at the termination of a call is a borrowed channel; and
   transferring an existing call on a borrowed channel to said released channel if said released channel is not borrowed.

* * * * *